United States Patent
Schmidt et al.

(10) Patent No.: US 9,231,814 B2
(45) Date of Patent: Jan. 5, 2016

(54) COMMUNICATION DEVICE, METHOD FOR GENERATING A TRANSPORT PROTOCOL MESSAGE, AND METHOD FOR PROCESSING A TRANSPORT PROTOCOL MESSAGE

(75) Inventors: Andreas Schmidt, Braunschweig (DE); Norbert Schwagmann, Lehe (DE); Achim Luft, Braunschweig (DE)

(73) Assignee: Intel Deutschland GmbH, Neubiberg (DE)

( * ) Notice: Subject to any disclaimer, the term of this patent is extended or adjusted under 35 U.S.C. 154(b) by 1332 days.

(21) Appl. No.: 11/423,946

(22) Filed: Jun. 13, 2006

(65) Prior Publication Data

US 2006/0285545 A1 Dec. 21, 2006

(30) Foreign Application Priority Data

Jun. 13, 2005 (DE) .......... 10 2005 027 247

(51) Int. Cl.
*H04L 29/06* (2006.01)

(52) U.S. Cl.
CPC ........ *H04L 29/06027* (2013.01); *H04L 65/608* (2013.01); *H04L 65/80* (2013.01)

(58) Field of Classification Search
USPC .................. 370/389, 401
See application file for complete search history.

(56) References Cited

U.S. PATENT DOCUMENTS

| | | | |
|---|---|---|---|
| 4,118,604 A | 10/1978 | Yanik | |
| 4,282,404 A | 8/1981 | Tanimoto et al. | |
| 4,490,584 A | 12/1984 | Lucey | |
| 5,883,963 A | 3/1999 | Tonella | |
| 6,359,656 B1 | 3/2002 | Huckins | |
| 6,707,819 B1 | 3/2004 | Fraser et al. | |
| 6,970,935 B1* | 11/2005 | Maes | 709/230 |
| 7,010,032 B1* | 3/2006 | Kikuchi et al. | 375/240.01 |
| 2004/0032859 A1* | 2/2004 | Miao | 370/352 |
| 2004/0264452 A1* | 12/2004 | Mittal | 370/389 |
| 2005/0094557 A1 | 5/2005 | Chen et al. | |

FOREIGN PATENT DOCUMENTS

| | | |
|---|---|---|
| DE | 2804721 A | 10/1978 |
| DE | 3423203 A1 | 1/1986 |
| EP | 1 657 894 A1 | 5/2006 |
| JP | 05048489 A | 2/1993 |

(Continued)

OTHER PUBLICATIONS

Schulzrinne, et al., IETF: RFC 3550, RTP: A Transport Protocol for Real Time Applications, http://www.ietf.org/rfc.html, Jul. 2003.

(Continued)

*Primary Examiner* — Jae Y Lee
*Assistant Examiner* — Aixa Guadalupe-Cruz
(74) *Attorney, Agent, or Firm* — Schwabe, Williamson & Wyatt, P.C.

(57) ABSTRACT

A communication device including a source coding unit source-coding data to be transmitted, a transport protocol unit, coupled to the source coding unit, generating at least one transport protocol message from the source-coded data, wherein the transport protocol unit can add to the source-coded data in the transport protocol message control information by means of which processing of the data to be transmitted can be controlled in a communication device receiving the transport protocol message.

14 Claims, 6 Drawing Sheets

(56) References Cited

FOREIGN PATENT DOCUMENTS

Figure 1:
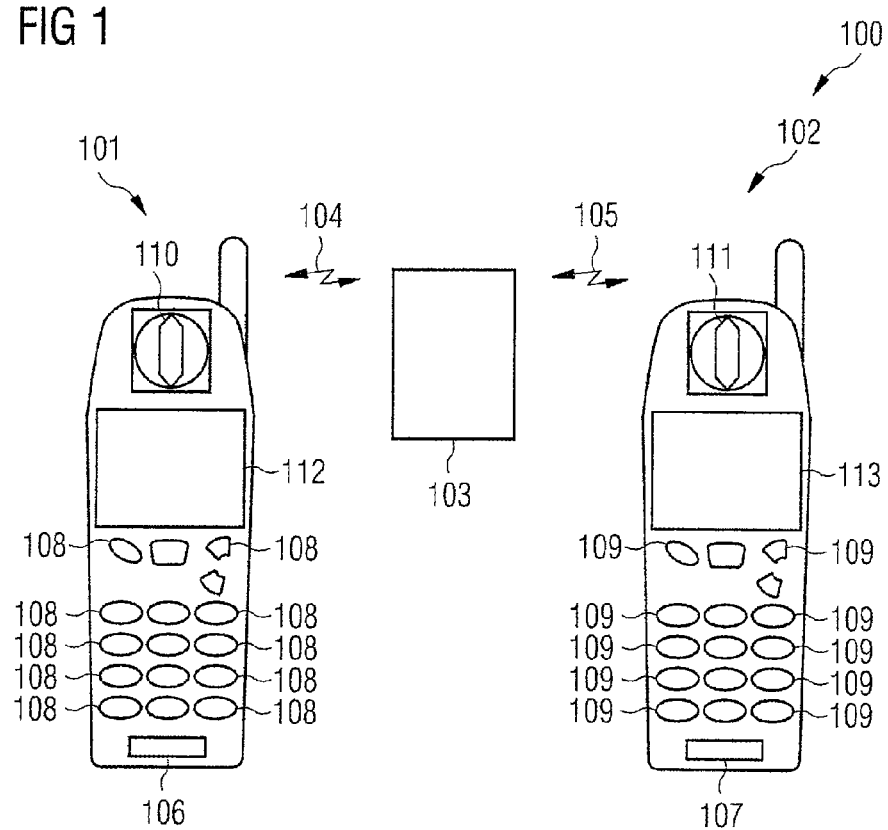

| KR | 2003050632 A | 12/2003 |
| SU | 663125 A1 | 5/1979 |
| WO | WO 01/63898 | 8/2001 |
| WO | WO-02/098077 A1 | 12/2002 |

OTHER PUBLICATIONS

I Schulzrinne, et al.,ETF: RFC 3551, RTP Profile for Audio and Video Conferences with Minimal Control, http://www.ietf.org/rfc.html, Jul. 2003.

3GPP TS 22.228 Version 6.7.0, Release 6, 3rd Generation Partnership Project; Technical Specification Group Services and Systems Aspects; Service Requirements for the Internet Protocol (IPO Multimedia Core Network Subsystem, Stage 1, http://www.3gpp.org/ftp/Specs/2004-12/Re1-6/22_series/.

3GPP TS 23.228 Version 6.8.0, Release 6, 3rd Generation Partnership Project; Technical Specification Group Services and Systems Aspects; IP Multimedia Subsystem (IMS); Stage 2, http://www.3gpp.org/ftp/Specs/2004-12/Re1-6/23_series/.

French Patent Office; Office Action for French App. No. 0605234 dated Apr. 17, 2008; 9 pages.

British Patent Office; Office Action for British App. No. GB0611688.3 dated Oct. 20, 2006; 6 pages.

British Patent Office; Office Action for British App. No. GB0611688.3 dated Aug. 28, 2007; 1 page.

German Patent Office; Office Action for German App. No. 102005027247.9-31 dated Feb. 7, 2006; 3 pages.

German Patent Office; Office Action for German App. No. 102005027247.9-31 dated Jun. 19, 2008; 3 pages.

German Patent Office; Office Action for German App. No. 102005027247.9-31 dated Nov. 16, 2010; 4 pages.

IETF: RFC 768; Jon Postel; "User Datagram Protocol"; Aug. 28, 1980; 3 pages.

IEFT: RFC 791; Jon Postel; "Internet Protocol"; Sep. 1981; 50 pages.

IETF: RFC 793; Jon Postel; "Transmission Control Protocol"; Sep. 1981; 90 pages.

* cited by examiner

COMMUNICATION DEVICE, METHOD FOR GENERATING A TRANSPORT PROTOCOL MESSAGE, AND METHOD FOR PROCESSING A TRANSPORT PROTOCOL MESSAGE

CROSS-REFERENCE TO RELATED APPLICATION

This application claims priority to German Patent Application Serial No. 10 2005 027 247.9, which was filed on Jun. 13, 2005, and is incorporated herein by reference in its entirety.

FIELD OF THE INVENTION

The invention relates to communication devices and to a method for generating a transport protocol message and to a method for processing a transport protocol message.

BACKGROUND OF THE INVENTION

During a communication link set up between two communication devices, for example during a telephone call, audio signals are usually exchanged between a transmitter communication device (usually called "source" in communication engineering) and a receiver communication device (usually called "sink" in communication engineering) in real time. During this process, the transmitter communication device usually has no possibility of influencing the handling (for example the processing of the received audio signals, for example for outputting the audio signals) of the received real-time data selectively in any way at the receiver communication device.

Conventionally it is necessary that, when the type of control information is changed which is coded together with the useful signal and transmitted, both the entire coder and the entire decoder are changed.

This is complicated and very expensive. If the coder and decoder are constructed as hardware components, both hardware components would have to be exchanged in the source and in the sink.

SUMMARY OF THE INVENTION

According to an embodiment of the invention a communication device comprises a source coding unit source-coding data to be transmitted, a transport protocol unit, coupled to the source coding unit, generating at least one transport protocol message from the source-coded data,
wherein the transport protocol unit can add to the source-coded data in the transport protocol message control information by means of which the processing of the data to be transmitted can be controlled in a communication device receiving the transport protocol message.

SHORT DESCRIPTION OF THE FIGURES

Figure 2:
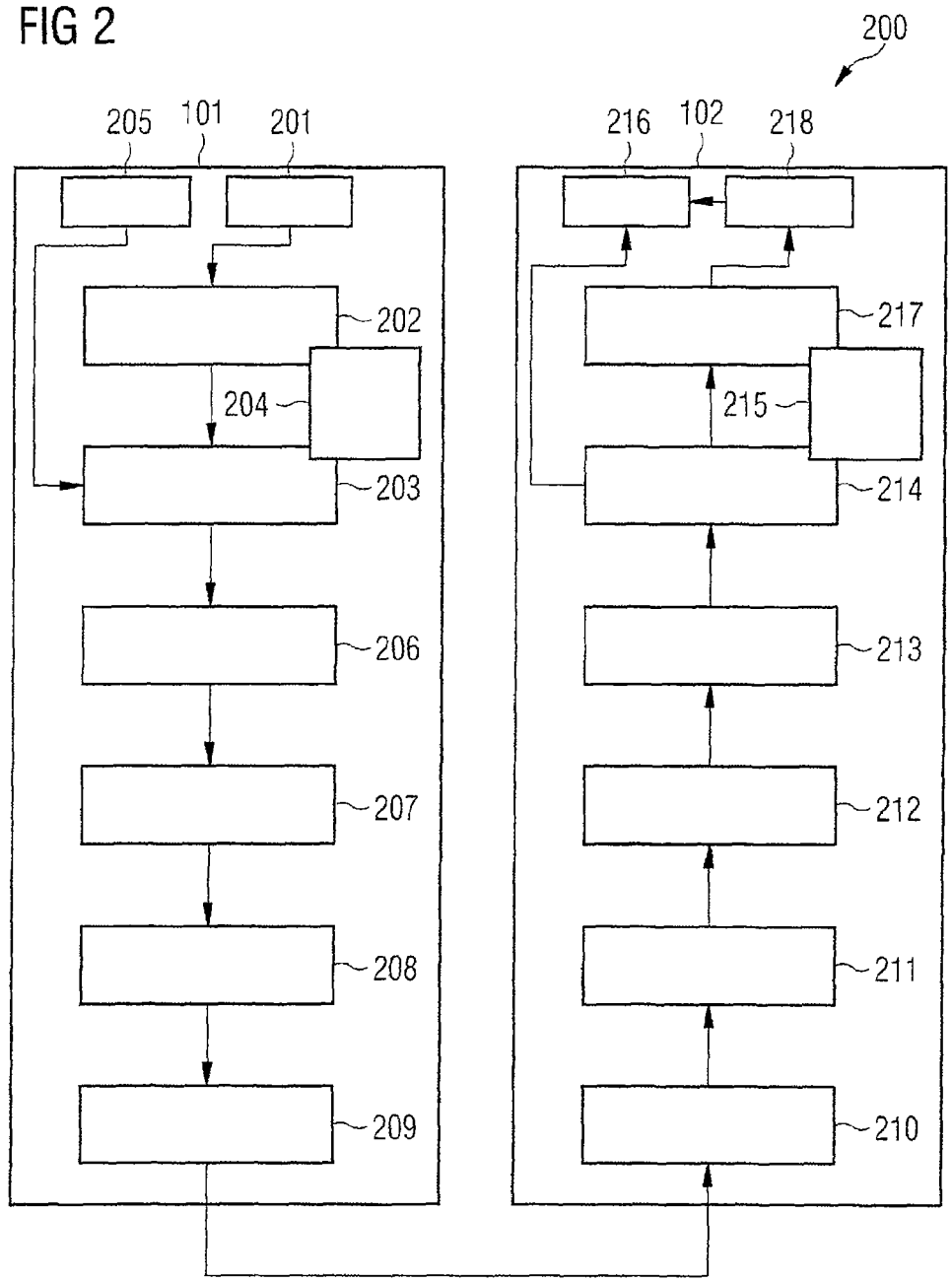
Figure 3:
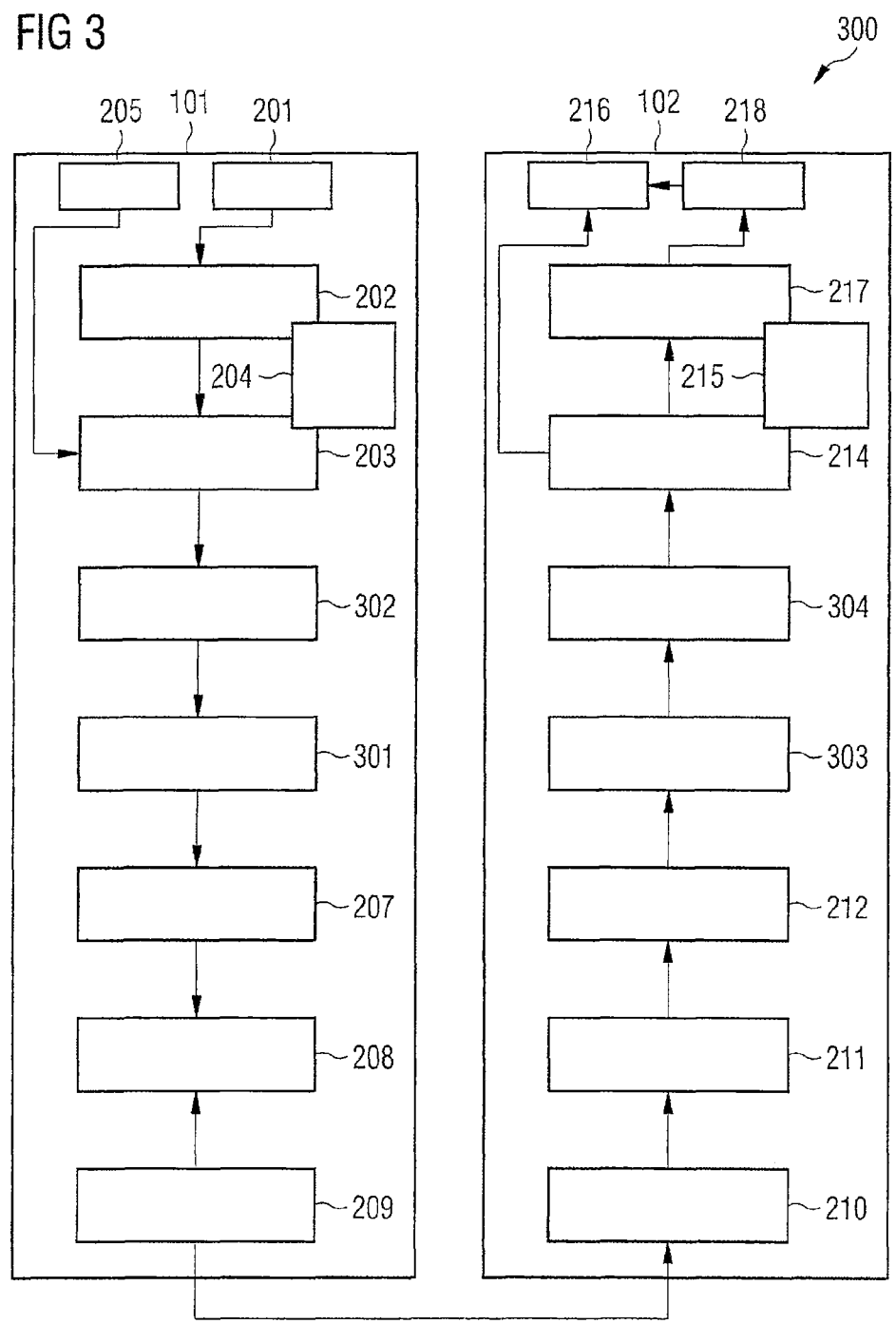
Figure 4:
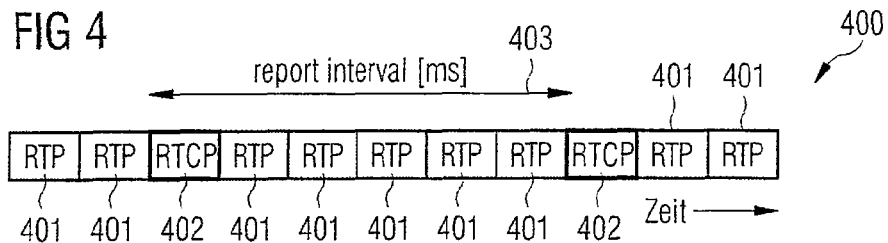
Figure 5:
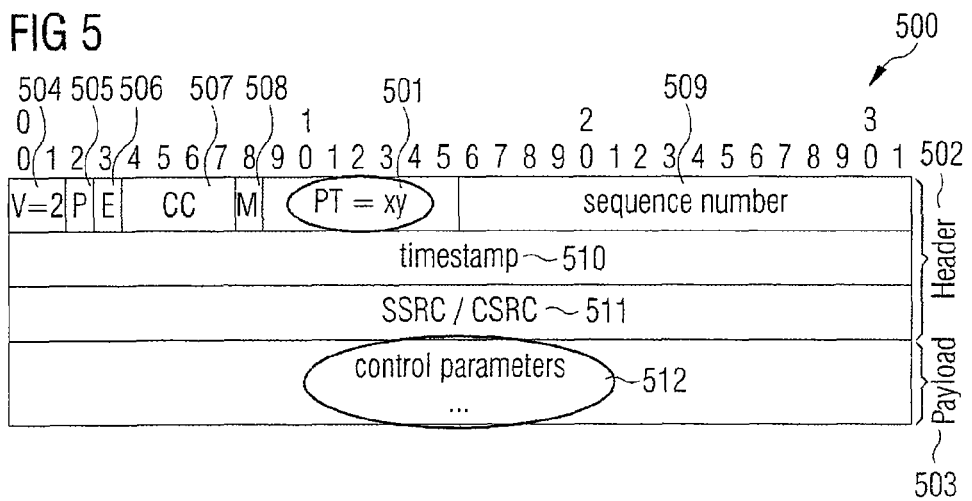
Figure 6:
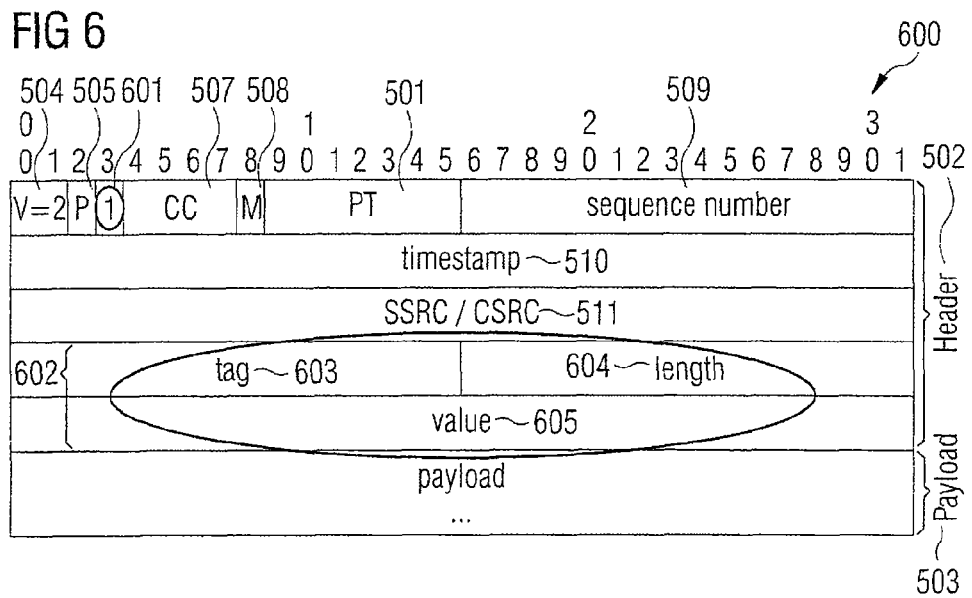
Figure 7:
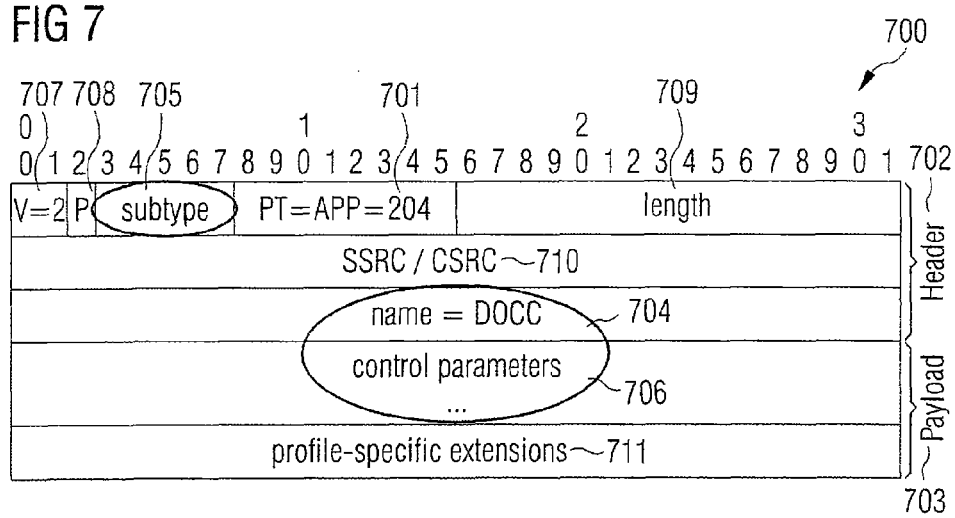
Figure 8:
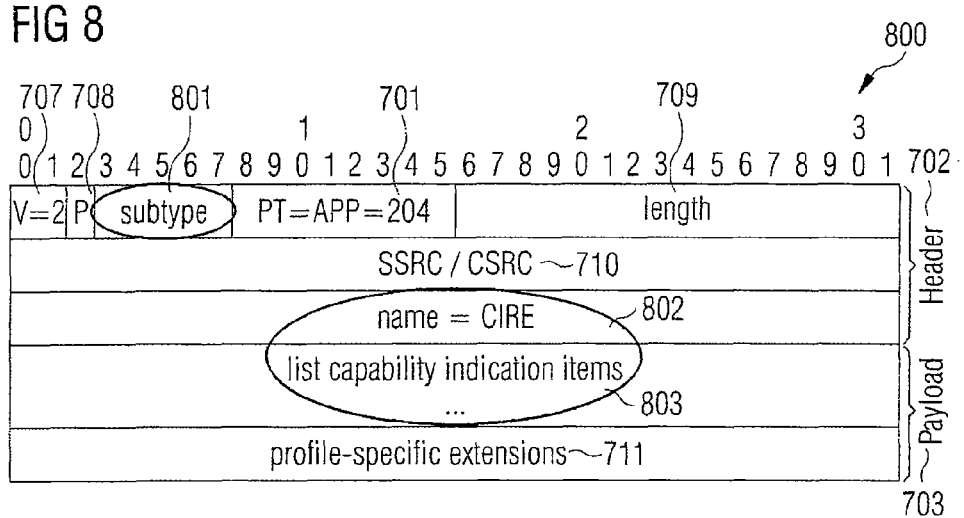
Figure 9:
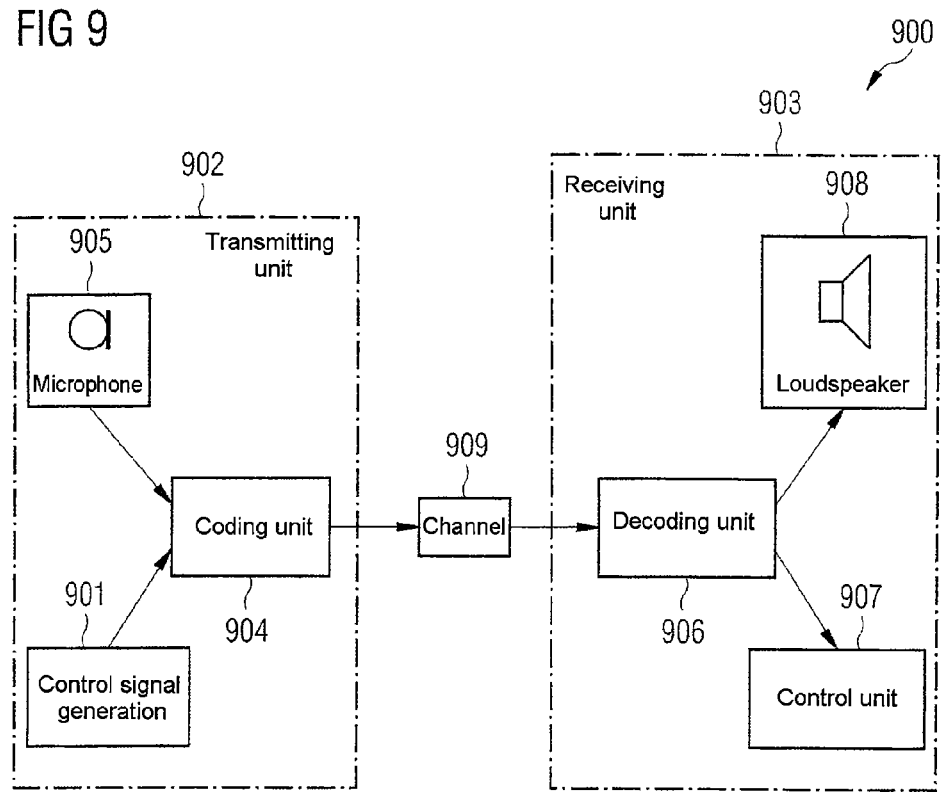

In the figures:
FIG. 1 shows a drawing of a communication system according to an exemplary embodiment of the invention;
FIG. 2 shows a block diagram in which the coding and decoding of data to be transmitted according to a first exemplary embodiment of the invention is shown;
FIG. 3 shows a block diagram in which the coding and decoding of data to be transmitted according to a second exemplary embodiment of the invention is shown;
FIG. 4 shows a drawing which shows the sequence of the data transmission with time with RTP data packets and RTCP data packets according to an exemplary embodiment of the invention;
FIG. 5 shows a structure of an RTP packet according to a first embodiment of the invention;
FIG. 6 shows the structure of an RTP packet according to a second embodiment of the invention;
FIG. 7 shows the structure of an RTCP packet according to a third embodiment of the invention;
FIG. 8 shows the structure of an RTCP packet according to a fourth embodiment of the invention; and
FIG. 9 shows a block diagram of a communication system according to another embodiment.

DESCRIPTION OF THE INVENTTION

According to an embodiment of the invention, a communication device is provided which comprises a transport protocol unit for generating source-coded data from at least one received transport protocol message and with a source decoding unit, coupled to the transport protocol unit, for source decoding the source-coded data. The transport protocol unit is set up in such a manner that it can determine from the transport protocol message control information by means of which the processing of the source-coded and/or source-decoded data can be controlled. As a supplement or as an alternative, the source decoding unit can also be arranged in such a manner that the decoding process itself can be influenced wholly or partially by means (of one part) of the control information determined from the transport protocol message. Furthermore, a processing unit is provided which is set up in such a manner that it processes the source-coded and/or source-decoded data in accordance with the control information determined.

A method for generating a transport protocol message according to an embodiment of the invention has the following steps:
the useful data to be transmitted are source-coded,
from the source-coded data, at least one transport protocol message is generated in accordance with a transport protocol.
Into the transport protocol message, control information is added by means of which the processing of the data to be transmitted in a communication device receiving the transport protocol message can be controlled (either before, during or after the decoding).

The control information can be inserted both in dependence on the variation of the useful data with time and in dependence on content aspects of the useful data in order to establish relationships between the control information and the useful data at the transmitter end. Analogously, the (for example content or time) reference established at the transmitter end between the control information and the useful data should be established again at the receiving end.

According to another embodiment of the invention, a method for processing a transport protocol message is provided in which source-coded data are obtained from at least one received transport protocol message in accordance with a transport protocol. From the transport protocol message, control information is also determined by means of which the processing of the source-coded and/or source-decoded data can be controlled or the decoding process itself can be controlled.

In the context of the present description, source-coding unit is understood to be a unit which compresses an uncompressed data record or datastream (for example a datastream of the video, audio or text type of media) in accordance with a predetermined algorithm for the purpose of irrelevancy and/or redundancy reduction (two generally known approaches for reducing the amount of data in communication engineering). In redundancy reduction, characteristics of the source are taken into consideration with the aim of reducing the amount of data to be transmitted. In the case of video coding, for example, statistical characteristics of a video signal, for example correlation between pixels adjacent to one another in time and space, are utilized for generating a code which is as compact as possible. Irrelevancy reduction has the aim of omitting during the transmission information which is not relevant to the sink. In real terms, for example in the case of video coding, this means that only a part of the video data are transmitted. The distortions, arising as a result, in which the least possible disturbance is perceived by the human observer are permitted. Correspondingly, in the context of the present description, a source decoding unit is understood to be a unit which decompresses a compressed datastream or data record (for example a datastream or a data record of the types of video, audio or text media) in accordance with a predetermined algorithm.

In the text which follows, the term codec is used for the totality of a source coding unit and of a source decoding unit, the term codec illustratively for example designates a unit of a compressor or a decompressor or a coder or a decoder, respectively.

However, it must be pointed out that in a communication device with unidirectional communication provided, theoretically only one source coding unit or one source decoding unit can also be provided. During the compressing, the file format is usually defined into which the completed material, i.e. the compressed data record or datastream is to be converted, i.e. files of the same file format do not necessarily have to be compressed by means of the same codec (algorithm).

A codec, like a source coding unit or a source decoding unit separately, can be present as separate hardware, i.e. by means of a special electronic circuit (hardware codec) or in the form of a computer program, i.e. in software (when it is called soft codec, for example).

Due to the performance of current processors, which has greatly risen in recent years, for example in the field of mobile telecommunication terminals, many compression methods can be calculated today in real time with the aid of a soft codec on corresponding processors. An advantage in using a soft codec lies in the fact that it no longer needs any special electronic circuits, i.e. no special hardware, thus providing for very cost-effective solutions. Furthermore, soft codec solutions are more future proof since subsequent software upgrades, i.e. subsequent updatings of the soft codec, can be performed in a very simple and thus cost effective manner.

In the context of the present description, a transport protocol unit is understood to be a unit which forms messages in accordance with a transport protocol in accordance with a communication layer model, for example according to the OSI (open system interconnection) communication layer model.

In one embodiment of the invention, at the level of the transport protocol layer, control information by means of which the processing (for example output or storage of the data to be transmitted) can be controlled at the transmitter end, are added to the source-coded data to be transmitted, and at the transport protocol layer level at the receiver end, control information can be extracted and used for controlling the processing (for example the storage of source-coded data before the decoding, the decoding process itself and/or the representation of the source-decoded data after the decoding in the receiver communication device).

A considerable advantage of one embodiment of the invention can be seen in that the control information are no longer added in the codec itself but below the codec application layer in the sense of a communication layer model, namely in the transport layer, which provides for very simple updating and changing of the control information to be transmitted without the requirement of changing the codec itself and thus the source coding unit or the source decoding unit, respectively. This results in considerable cost saving and flexibilization of the communication devices which is of great advantage particularly in the field of mobile radio communication devices.

The embodiments of the communication devices described apply both to the method for generating a transport protocol message and for the method for processing a transport protocol message.

The transport protocol unit can contain units of a number of interacting transport protocol units of different transport protocols. Thus, for example, the transport protocol unit can have a first part-transport protocol unit and a second part-transport protocol unit. The second part-transport protocol unit is arranged in such a manner that it forms from the message generated by the first part-transport protocol unit a message according to, for example, the Transport Control Protocol (TCP) or according to the User Datagram Protocol (UDP). According to this embodiment of the invention, the first part-transport protocol unit is arranged in such a manner that it can add to the source-coded data in the transport protocol message control information by means of which the processing of the data to be transmitted can be controlled in a communication device receiving the transport protocol message.

To illustrate, this embodiment of the invention can be seen in that a part-transport protocol layer for coding the data to be transmitted is provided in which the control information is added. This part-transport protocol layer is illustratively arranged above (over) the second part-transport protocol layer, for example TCP or UDP, in the sense of the communication layer model, so that the data generated by the first part-transport protocol unit are packed in TCP messages or UDP messages, i.e. in the corresponding data packets.

According to an embodiment of the invention, the first part-transport protocol unit is arranged for generating at least one message from the source coded data according to one of the following communication protocols:

Real Time Transport Protocol (RTP),
Real Time Transport Control Protocol (RTCP), or
Hypertext Transfer Protocol (HTTP).

For example when transmitting real-time data, for example video signals or audio signals, i.e. data which must be displayed in real time at the receiver, that it is of particular advantage to use a transport protocol which ensures real-time data transmission, for example the RTP, or the RTCP controlling the RTP.

In general, any transport protocol can be provided for receiving the control information for processing the data to be transmitted in the receiver unit.

According to an embodiment of the invention, the first part-transport protocol unit is arranged in such a manner that it can insert the control information into the header area of the transport protocol message.

According to another embodiment of the invention, it is provided that the first part-transport protocol unit is arranged in such a manner that it can insert the control information in the useful data field area of the transport protocol message.

According to an embodiment of the invention, the control information can be used for controlling the type of output of audio information as data to be transmitted, for example the volume or the adding, activating or deactivating of additional sound effects during the output of audio information.

In an embodiment of the invention, the control information can control, as an alternative or in addition, a storage of a part of the data to be transmitted, which makes it possible, for example, in a video datastream (or in an audio datastream), to temporally or permanently store a predetermined part so that the receiver can house this information reproduced at a later time, possibly even by another terminal which is capable of representing the audio information or the video information.

According to an embodiment of the communication device receiving the data to be transmitted, it is provided that the transport protocol unit has a first part-transport protocol unit and a second part-transport protocol unit, the second part-transport protocol unit being arranged for generating at least one message for the first part-transport protocol unit from a received message according to the transport control protocol or according to the User Datagram Protocol. The transport protocol unit is arranged in such a manner that it can determine from the transport protocol message control information by means of which the processing, for example of the source-decoded data, can be controlled.

The first part-transport protocol unit can be arranged for decoding a message in accordance with one of the following communication protocols:
  Real Time Transport Protocol (RTP);
  Real Time Transport Control Protocol (RTCP); or
  Hypertext Transport Protocol (HTTP).

The data to be transmitted are, for example, real-time data in which case the use of the RTP and/or of the RTCP is provided, for example.

The first part-transport protocol unit can be arranged in such a manner that it can determine the control information from the header area of the transport protocol message or, as an alternative, it can be arranged in such a manner that the control information can be determined by it from the user data field area of the transport protocol message.

According to an embodiment of the invention, the processing unit is arranged in such a manner that it can control, by means of the control information, the type of output of audio information as data to be transmitted, for example the volume of the audio information to be output and/or the activating and/or deactivating of sound effects during the reproduction of audio information.

In an alternative or additional embodiment of the invention, the processing unit is arranged in such a manner that it can store a part of the data to be transmitted by means of the control information.

According to an exemplary embodiment of the invention, the speaker or the transmitter communication device, respectively, in other words the transmitter communication device (transmitter) can thus influence the audio output in the receiving device (in other words in the receiving communication device) during a communication link set up, for example during a telephone call, for example change the volume or pitch of particular speech passages or insert or remove special effects such as echo or reverberation. This can be done, for example, statically, i.e. for the duration of a telephone call, generally during an existing communication link, constantly or dynamically, i.e. adapted to certain audio passages.

Furthermore the speaker (transmitter), in other words the transmitter communication device, can identify, during a communication link set up, i.e., for example, during a telephone call, certain passages of his voice contribution for separate handling in the communication terminal, i.e. in the receiving communication device, of the receiver (for example mark the beginning and the end of a route description and initiate that the text between the markings is stored in the terminal of the receiver so that he is enabled to listen to the route description again if necessary).

Due to the exemplary incorporation of control signals in an RTP message and/or RTCP messages according to [1] (for example as profile or profile extension for RTP/RTCP), the control signals, i.e. generally the control information, can be used for handling real-time data in different ways by codec in the receiving device, even on codec developed in the future, and very advantageously evaluate it synchronized in time in the receiving device.

Exemplary embodiments of the invention are shown in the figures and will be explained in greater detail in the text which follows. Equal or identical components in the figures are provided with identical reference symbols.

FIG. 1 shows a communication system 100 according to a first exemplary embodiment of the invention, the communication system being constructed for communication according to a mobile radio communication standard, for example a cellular mobile radio communication standard, for example according to UMTS (Universal Mobile Telecommunications System), as an alternative according to another 3GPP communication standard or also according to GSM.

FIG. 1 shows, for reasons of simple representation, a first mobile radio communication terminal 101 and a second mobile radio communication terminal 102. The two mobile radio communication terminals 101, 102 have set up a communication link which is provided by means of a mobile radio communication network 103 via a first air interface 104 with respect to the first mobile radio communication terminal 101 and by means of a second air interface 105 with respect to the second mobile radio communication terminal 102, respectively.

Each mobile radio communication terminal 101, 102 has a respective microphone 106 and 107, respectively, for picking up speech signals and control keys 108 and 109, respectively, and loudspeakers 110 and 111, respectively, for reproducing sound signals or decoded speech signals, and a display unit 112 and 113, respectively, for displaying text information, still-frame information or video information.

In the text which follows, it is assumed, without restricting the general validity, that voice signals are to be transmitted from the first mobile radio communication terminal 101 to the second mobile radio communication terminal 102.

However, it must be pointed out in this context that the invention does not require either that it is a mobile radio communication terminal or that a mobile radio communication network is provided. The invention can be similarly used in the context of a fixed-network communication network which provides communication links to fixed-network communication terminals.

For transmitting voice signals in the mobile radio field, for example, the AMR coding method is used (mainly in a network environment which is arranged in accordance with the GSM standard according to 3GPP (Third Generation Partnership Project)) or in accordance with a QCELP 13k (mainly in a network environment which is arranged according to CDMA 2000 communication standard according to 3GPP2).

In the text which follows, integrating control signals into the so-called Real Time Transport Protocol (RTP) is explained by way of example.

RTP provides a number of advantages in the context of the exemplary embodiments described, for example:

1) In RTP, profiles can be defined for certain classes of useful data such as, for example, the "RTP Profile for Audio and Video Conferences". According to the exemplary embodiments of the invention, a set of control signals can also be defined as profile or profile extension for RTP.

2) RTP allows the control signals to be transported independently of the codec actually used.

3) Control signals transported with RTP as will be described in greater detail in the text which follows can be evaluated synchronized in time in the receiving device and, in consequence, can be allocated to certain codec real-time passages.

4) The RTP is a transport protocol which is predominantly used when data are to be transmitted in real time.

RTP does not perform resource management, neither can it guarantee any quality of service (QoS). All this is regulated by other protocol layers in the area of the protocol layer communication architecture. The so-called Real Time Transport Control Protocol (RTCP), by means of which the transport of data can be controlled and monitored, exists as an extension to RTP and is provided according to an embodiment of the invention. It must be pointed out that the RTCP is optional, i.e. RTP can also be implemented without RTCP in an embodiment of the invention.

It must also be pointed out that in an embodiment of the invention in which it is not required that the data are transmitted in real time, the invention can also be used by using HTTP as a protocol for receiving the control information described in the text which follows. This is done in the same manner as described for RTP and RTCP in the text which follows.

FIG. 2 shows the sequence of coding and decoding of data 201 to be decoded and to be transmitted, for example of voice data which have been picked up by means of the microphone 106 of the first mobile radio communication terminal 101, symbolically for the first mobile radio communication terminal 101 and the second mobile radio communication terminal 102 in a block diagram 200. The data to be transmitted, voice data according to the present exemplary embodiment of the invention, are coded in a codec which, for example, corresponds to a source encoder which is set up for coding the voice signals 201 according to AMR or according to QCELP 13k (codec 202). The source-coded data to be transmitted are supplied to an RTP transport protocol unit 203 in which the source-coded data of the codec 202 are coded into RTP data packets and/or into RTCP data packets according to the RTP and/or according to the RTCP, optionally by using RTP profiles 204.

As will still be explained in greater detail in the text which follows, it is provided, according to the following embodiments of the invention, to add control information 205 to the RTP data packets or the RTCP data packets, respectively.

FIG. 4 shows the sequence in time of the data transmission with RTP data packets 401 and RTCP data packets 402 in a block diagram 400 at transport protocol layer level. It must be pointed out that the RTP data packets 401 and the RTCP data packets 402 do not necessarily have to have the same amount of data. The division shown in FIG. 4 that an RTCP data packet 402 is inserted after five RTP data packets 401 each is only meant to be an example and can be changed arbitrarily in other embodiments. The space between two RTCP data packets 402 is called "report interval" 403 and is usually specified in millisecond (ms) units.

The RTP/RTCP data traffic can take place between two telecommunication terminals, namely between the first mobile radio communication terminal 101 and the second mobile radio communication terminal 102 as shown in FIG. 2 or, as an alternative, between a telecommunication terminal and a network unit with switching functions.

Like RTP, RTCP is also independent of the underlying protocol layers and can be used in various network environments.

FIG. 2 shows an exemplary protocol layer model implementation which is based on the User Datagram Protocol (UDP) and the Internet Protocol (IP).

According to this embodiment of the invention, the RTP data packets 401 and/or the RTCP data packets 402 are thus packaged, i.e. coded, in UDP data packets by means of a UDP transport protocol unit 206 and supplied to an IP protocol unit 207 which codes the UDP data packets into IP data packets. The IP data packets, in turn, are supplied to a layer-2 protocol unit 208 in which, for example, the RLC sublayer protocol and a Medium Access Control sublayer protocol are implemented.

The IP data packets coded by means of the layer-2 protocol layers 208 are supplied to a layer-1 protocol layer 209, i.e. to a physical protocol layer which sets up a physical communication link with a corresponding physical protocol layer 210 on the side of the second mobile radio communication terminal 102. The data packets are transmitted via the physical layer, switched by the mobile radio communication network 103 according to the exemplary embodiment of the invention, to the second mobile radio communication terminal 102 where they are decoded according to the protocol of the physical layer 210 and supplied to the corresponding layer-2 protocol sublayer 211, also implemented, for example, by using RLC protocol layer and/or a Medium Access Control sublayer protocol, and are there decoded. The data packets decoded by this layer-2 protocol layer unit 211 are supplied to an IP protocol layer unit 212 by means of which the data packets supplied to it are unpacked according to the Internet Protocol and the correspondingly decoded data packets are supplied to the UDP protocol unit 213 which decodes the IP data packets according to the UDP. The data packets decoded by the UDP protocol unit 213 are supplied to the RTP/RTCP protocol unit 214 which decodes them according to the RTP and/or according to the RTCP, possibly by using RTP profiles 215. During this decoding, the control information 205 is extracted or, in other words, determined, from the RTP data packets 401 and/or the RTCP data packets 402 as will still be explained in greater detail in the text which follows. The control information is supplied to a processing unit 216.

Furthermore, the RTP-decoded data packets or the RTCP-decoded data packets, respectively, are supplied to a source decoder in a codec 217 in the receiver of the second mobile radio communication terminal 102 by means of which source decoding is performed, for example according to AMR or QCELP 13 k by means of which voice signal data 218 to be output are generated which are also supplied to the processing unit 216.

The processing unit 216 is, for example, a memory or a display unit or the microphone 107 of the second mobile radio communication terminal 102 depending on the type of data to be processed.

If the data are voice signal data 218 as in the present exemplary embodiment, they are output by means of the loudspeaker 111 taking into consideration the control information 205 during the output. For example, the volume or the pitch of the voice signal 218 can be changed in accordance with the control information as will still be explained in greater detail in the text which follows, or a special effect like echo or reverberation can be activated or deactivated by means of the control information.

In this context, it must be noted that the UDP has a relatively small range of functions. It provides applications with direct access to the IP layer 207 without guaranteeing the delivery of data packets and only provides a checksum check and a port-multiplexing functionality.

In an alternative embodiment of the invention, it is provided to use in the context of the transmission and provision of real-time services, the IP-based Multimedia Subsystem (IMS), which is based on the Internet Protocol. IMS can be understood to be a session control and service delivery platform by means of which it is possible to provide different multimedia applications and services for mobile subscribers (for example mobile radio subscribers but also fixed subscribers, i.e. for example, fixed-network subscribers). Using different media (voice, image, text, . . . ), a mixture of telecommunications services and data services provides for a data exchange between the (mobile) users which has many more facets and is much more "natural" than has been the case hitherto.

The services instant messaging, presence and push to talk over cellular (PoC) are possible fields of application for the embodiments of the invention and for IMS.

The control information 205 which, for example, can be input by a user by means of the control keys 108 of the first mobile radio communication terminal 101, can be of different type and is used, for example, for controlling the processing of the useful data 201 to be transmitted in the receiver, i.e. in the second mobile radio communication terminal 102 in the present exemplary embodiment.

Examples of possible control signals 205 as provided in different embodiments of the invention, for handling, for example, real-time data in the receiving device, i.e. in the second mobile radio communication terminal 102, are:

1) The receiving device, i.e. the second mobile radio communication terminal 102, indicates that it supports sound effects activated by the transmitter (the first mobile radio communication terminal 101) during the transmission of data of the video type. The first mobile radio communication terminal 101 decides to use this function and, during the transmission of a video sequence, influences the audio output in the receiving device, i.e. in the second mobile radio communication terminal 102 (for example, it changes the volume or pitch of the voice passages or adds special effects like echo or reverberation temporarily).

2) The receiving device (i.e., for example, the second mobile radio communication terminal 102) indicates that it supports the storing of real-time data, activated by the transmitter (i.e., for example, by the first mobile radio communication terminal 101) during the transmission of data of the audio type. The speaker, or, in other words, the user of the first mobile radio communication terminal 101, decides to use this function and marks, for example by using the input keys 108, the beginning and the end of particularly important sections of his spoken contribution during a telephone call (for example, as described above, the description of a route or the like) for storage in the receiving device 102. The second mobile radio communication terminal can then repeatedly listen to the marked spoken contribution, if necessary, without having to initiate and set up a new telecommunication link with the first mobile radio communication terminal 101.

3) The second mobile radio communication terminal, generally the receiving device, indicates that it generally does not support control signals, sent out by the first mobile radio communication terminal 101, generally by the transmitter, for handling real-time data. In contrast, a switching unit interposed by the communication network 103 and provided there indicates that it can process control signals sent by the transmitter. Both are indicated to the transmitter and it then decides nevertheless, during a telephone call, to identify the beginning and the end of particularly important sections of his spoken contribution for storage. Instead of the second communication terminal 102, the switching unit interposed in the mobile radio communication network 103 then performs the storing of the marked spoken contributions, for example on an external server, and informs the receiver about the possibility that he can listen again to the marked spoken contribution, if necessary, by setting up a communication link to the corresponding network unit/the corresponding server.

FIG. 3 shows an alternative embodiment of the invention which greatly resembles the first embodiment shown in FIG. 2, the difference being that the communication system 300 according to the second exemplary embodiment of the invention is not based on the UDP transport protocol but on the Transmission Control Protocol (TCP) transport protocol, a TCP protocol unit 301 being additionally provided according to the present embodiment instead of the UDP protocol layer 206 and arranged above it an intermediate layer protocol unit 302 which receives the RTP data packets 401 or the RTCP data packets 402, respectively, and converts them into data packets which can be processed by the TCP protocol unit 301. The TCP data packets are supplied to the IP data protocol unit 207.

According to the second embodiment of the invention, a corresponding TCP protocol unit 303 and a corresponding intermediate layer protocol unit 304 are provided in the second mobile radio communication terminal 102 for the corresponding decoding of the data packets.

Since the communication architecture of the two embodiments is otherwise identical, the description of the communication sequence will not be repeated.

It must be pointed out that in the context of the embodiments of the invention described in the text which follows, the transmitter, i.e., for example, the first mobile radio communication terminal 101, does not supplement the control parameters, i.e. the control information 205, at the application protocol layer level but in the underlying transport protocol, i.e. in a transport protocol layer arranged below the codec 202, during the transmission of real-time data.

In the exemplary embodiments, which are implemented in a telecommunication network based on the IMS technology, the control data are transmitted at RTP/RTCP protocol layer level. As already mentioned above, there are two different types of data packets, one for RTP data packets and one for RTCP data packets.

In the text which follows, a number of alternative possible solutions for embedding the control information 205 in RTP data packets 401 or in RTCP data packets 402 are described and it must be pointed out that the alternatives described in the text which follows can also be implemented in combination with one another.

FIG. 5 shows an RTP data packet 500 according to a first embodiment of the invention with a new type of payload.

Using the field payload type (PT) 501 in the header area 502 of the RTP data packet 500, the first mobile radio communication terminal 101 signals to the receiving, i.e. second mobile radio communication terminal 102 what type of data are contained in a payload data area 503 of the RTP data packet 500. According to this embodiment of the invention, these are the control signals (in other words, the control information 205) (control parameters 512). To signal this, the value of the payload type field 501 is set to a "new" value "xy".

Furthermore, the RTP data packet also has the following fields in the header area 502:
 a version field 504,
 a padding field 505,
 an extension field 506, a CSRC (CC) counter field 507,
a marker field 508,
a sequence number 509,
a time stamp field 510 and
an SSRC/CSRC field 511.

FIG. 6 shows an RTP data packet 600 according to a second embodiment of the invention, identical fields as in the RTP data packet 500 in FIG. 5 being provided with identical reference symbols.

In the RTP data packet 600, another modification is provided and bit No. 3 601 in the header area 502 (fourth bit from the left) is used for signaling from the transmitting unit to the receiving unit that a further header field 602 has been added to the standard header field 502 of the RTP data packet, which is arranged following the standard header field 502, in other words that the standard header field 502 has been extended by a new header field 602 by the transmitting unit 101.

According to this embodiment it is then provided that the new, additionally introduced header field 602 contains the control parameters for handling the useful data in the payload part 503 at the receiving end. The syntax decoding and the semantics of this newly defined header field 602 are to be defined, for example, in an associated RTP profile 204. In this context, it is provided, for example, to use a TLV structure for the additional header field 602 in the RTP header field (Tag 603: the unambiguously defined field name; length 604: the length of the existing field value or values in bits or bytes; value 605: the actual field value).

Depending on definition (for example in the RTP profile 204), the new header field area 602 can also contain more than only one control parameter, for example when the RTP profile 204 defines accordingly that an interleaving of other TLV objects is possible in the value 605 field area. In FIG. 6, the control signals (i.e. the control information 605) (control parameters) are thus all located in the value field area 605 and possibly have interleaved TLV objects.

FIG. 7 shows an RTCP data packet 700 according to a first embodiment of the APP type with the entries in subsequent fields name and subtype described and control parameters in the payload field area. According to this embodiment, it is thus provided to modify the RTCP data packets 700 and to embed the control information 205 in it and to transmit it to the second mobile communication terminal 102.

Using the fourth entry 701 (bit No. 8 to No. 15) in the header field area 702, the transmitting unit signals to the receiving unit what type of data are contained in the payload part 703 of the RTCP data packet 700.

The present embodiment is an Application Defined Packet (APP) for which, according to standard, the value of the packet type field is set to PT=204. The fact that this is control information 205 according to the invention for outputting the data 201 is signaled by the name field 704 to which the value of a DOCC (data operation control command) is allocated according to the present embodiment.

The type of handling desired by the transmitting unit is specified by the subtype field 705 for the receiving unit. For example, subtype=00001 (as 5-bit word) could be provided for the sound effect "reverberation", subtype=00010 for the sound effect "echo", etc. To signal parameters additionally needed for a particular effect to the receiving device, control parameters 706 can also be inserted at the end of the RTCP data packet 700, which can then be subtype-specific. Furthermore, the RTCP data packet 700 also contains the following fields:
a version field 707,
a padding field 708,
a length information field area 709,
a SSRC/CSRC field area 710 and
a profile-specific extension field area 711.

FIG. 8 shows an RTCP data packet 800 according to a further embodiment of the invention, of the APP type, the fourth field entry 701 (bits No. 8 to No. 15) in the header field area 702 being used, according to the present embodiment of the invention, for signaling, as already explained above, what type of data are contained in the payload part 703 of the RTCP data packet 800.

In the present example, this is again an application defined packet (APP) for which, according to the standard, the value of the packet type field is set to PT 204. The fact that this is the transmission of device characteristics (hardware and/or software characteristics) of the receiving unit which are transmitted by the receiving unit to the transmitting unit, is for example specified by a new value in the name field 802 such as, for example, a CIRE (Capability Indication Receiving Entity) value.

In this case, however, the same field value as above can be used, if necessary, which is only a question of definition.

The subtype 801 is then used for the more accurate specification of a characteristic supported at the receiving end, for example subtype=00011 stands for the characteristic "output of audio data can be influenced", and at the end of the RTCP data packet 800, a list of capability indication items 803 can also be inserted in order to be able to signal parameters needed additionally. These are then subtype-specific.

For example, in the case of the subtype=00011 ("output of audio data can be influenced"), the list of the capability indication items 803 parameters can contain the following especially for this functionality: the volume can be controlled in five steps, a reverberation effect can be added, etc.

Other possible values are, for example:
storing of real-time data generally possible,
storing of real-time data possible if enabled by the receiver,
start marking and end markings in the datastream are supported,
output of audio data can be influenced,
volume can be varied,
side effects can be added,
switching background music on and off is supported, etc.

In this context, it must be noted that the list described above is only meant by way of example and can be supplemented without problems depending on application and requirement.

In a further embodiment of the invention, it is assumed that, according to the present embodiment of the invention, the RTCP data packet 800 is used for transmitting the characteristics supported by the receiving unit in a network architecture in which a network unit with switching functions is interposed between the at least two telecommunication terminals 101, 102. In this scenario, it is provided that the network unit can extract, solve and process the list of capability indication items 803 from the received RTCP data packets 800 and can adapt the datastreams to be forwarded to the receiving unit at the network side in accordance with the control parameters added by the transmitting unit, if the receiving unit itself is not (yet) capable of doing so and allows it.

The invention illustratively provides a possibility for the transmitter to selectively influence the handling (for example the processing, for example the output) of the real-time data to be transmitted in the receiving device. In this process, the control parameters are to be advantageously included not in the codec but in the underlying transport protocol layer so that a clear separation of codec and control parameters is guaranteed. In this manner, the invention can also be applied in a generally applicable way to any codec developed in future without having to change the codec itself.

FIG. 9 shows in a block diagram an embodiment in which the control signals are added to the data to be transmitted as part of the codec.

Thus, a possibility for transmitting the control information 901 for controlling a treatment at the receiving end of the real-time data to be transmitted from the source (i.e. the transmitting unit 902) to the sink (i.e. the receiving unit 903) in modifying the correspondingly used codec 904 in the transmitting unit 902. If the real-time data are a voice signal which, for example, is spoken into a microphone 905 of the transmitting unit, the coding unit 904 at the transmitter end could have, for example, for the AMR codec already mentioned above and frequently used, apart from the input to the voice/audio data, another input for the control signals 901, and the decoding unit 906 at the receiving end could have, apart from the output for the voice/audio data, another output for control signals 907.

In this case, the codec itself contains the control signals, with the aid of which the control unit 907 shown in FIG. 9 can selectively influence the handling of the real-time data transmitted (for example their output or processing) in the receiving device 903, for example by means of a loudspeaker 908, in accordance with the commands added at the transmitter end (and thus according to the control information 901).

As shown in FIG. 9, the transmitting unit 902 is coupled to the receiving unit 903 by means of a communication network 909.

This is not a generally valid, i.e. codec-independent method. Each codec would have to be separately modified which would be associated with considerable standardization effort in different standardization organizations.

The invention claimed is:

1. A method for generating a transport protocol message comprising:
    transmitting source-coding data by a communication device; and
    generating at least one transport protocol message in accordance with a transport protocol from the source-coded data by the communication device, the at least one transport protocol message including control information for controlling a playback processing of source-decoded data of the source-coded data in a communication device receiving the transport protocol message,
    wherein: the at least one transport protocol message is a real time transport protocol (RTP) message or a real time transport control protocol (RTCP) message and includes a header value to indicate the at least one transport protocol message is a type that conveys control parameters for controlling playback processing; and the control information is to be included in a payload of the at least one transport protocol message to control how the communication device is to identify or modify an output of one or more portions of audio content.

2. A method for processing a transport protocol message comprising:
    generating by a communication device data source-coded in accordance with a transport protocol from at least one received transport protocol message;
    source-decoding by the communication device the source-coded data;
    determining by the communication device control information for controlling a playback processing of the source-decoded data from the at least one received transport protocol message; and
    playback processing the source-decoded data in accordance with the determined control information,
    wherein: the at least one received transport protocol message is a real time transport protocol (RTP) message or a real time transport control protocol (RTCP) message and includes a header value to indicate the at least one received transport protocol message is a type that conveys control parameters for controlling playback processing; and the control information is to be included in a payload of the at least one received transport protocol message to control how the communication device is to identify or modify an output of one or more portions of audio content.

3. A communication device comprising:
    a source coding means for source-coding data to be transmitted; and
    a transport protocol means, coupled to the source coding means, for generating at least one transport protocol message from the source-coded data, the at least one transport protocol message including control information for controlling a playback processing of source-coded data of the source-coded data in a communication device receiving the transport protocol message,
    wherein: the at least one transport protocol message is a real time transport protocol (RTP) message or a real time transport control protocol (RTCP) message and includes a header value to indicate the at least one transport protocol message is a type that conveys control parameters for controlling playback processing; and the control information is to be included in a payload of the at least one transport protocol message to control how the communication device is to identify or modify an output of one or more portions of audio content.

4. A communication device comprising:
    a processor; and
    a memory comprising a set of instructions that when executed by the processor causes:
        a source coding unit to source code data to be transmitted; and
        a transport protocol unit, coupled to the source coding unit, to generate at least one transport protocol message, the at least one transport protocol message including control information for controlling a playback processing of data source decoded from the source-coded data in a communication device receiving the transport protocol message,
    wherein: the at least one transport protocol message is a real time transport protocol (RTP) message or a real time transport control protocol (RTCP) message and includes a header value to indicate the at least one transport protocol message is a type that conveys control parameters for controlling playback processing; and the control information is to be included in a payload of the at least one transport protocol message to control how the communication device is to identify or modify an output of one or more portions of audio content.

5. The communication device as claimed in claim 4, wherein the transport protocol unit has a first partial transport protocol unit and a second partial transport protocol unit, the memory comprising a further set of instructions that when executed by the processor causes:
    the second partial transport protocol unit to generate a second transport protocol message from a first transport protocol message generated by the first partial transport protocol unit in accordance with the Transport Control Protocol or in accordance with the User Datagram Protocol, and the first partial transport protocol unit to generate the first transport protocol message, wherein the first transport protocol message includes the control information.

6. The communication device as claimed in claim 5, wherein the memory comprises a further set of instructions that when executed by the processor causes the first partial transport protocol unit to generate the first transport protocol message in accordance with RTP or RTCP.

7. The communication device as claimed in claim 4, wherein the data to be transmitted is real-time data.

8. The communication device of claim 4, wherein the control information is to modify an output of one or more portions of audio content by adjusting volume of, adjusting pitch of, or adding a special effect to the output of the one or more portions of the audio content.

9. The communication device of claim 4, wherein the control information is to identify the one or more portions of audio content to facilitate selective playback of the one or more portions of audio content by the communication device.

10. A communication device comprising:
a processor; and
a memory comprising a set of instructions that when executed by the processor causes:
a source decoding unit, coupled to a transport protocol unit, to source decode source-coded data;
a transport protocol unit to:
generate source-coded data from at least one received transport protocol message, and
determine control information for controlling a playback processing of the source-decoded data from the at least one received transport protocol message; and
a processing unit configured to playback process the source-decoded data in accordance with the determined control information,
wherein: the at least one received transport protocol message is a real time transport protocol (RTP) message or a real time transport control protocol (RTCP) message and includes a header value that indicates the at least one transport protocol message is a type that conveys control parameters for controlling playback processing; and the control information is included in a payload of the at least one received transport protocol message to control how the communication device is to identify or modify an output of one or more portions of audio content.

11. The communication device as claimed in claim 10, wherein the transport protocol unit has a first partial transport protocol unit and a second partial transport protocol unit, the memory comprising a further set of instructions that when executed by the processor causes: the second partial transport protocol to generate at least one transport protocol message for the first partial transport protocol unit from a received message in accordance with the Transport Control Protocol or in accordance with the User Datagram Protocol, and the first partial transport protocol unit to determine the control information from the at least one transport protocol message the control information.

12. The communication device as claimed in claim 11, wherein the memory comprises a further set of instructions that when executed by the processor causes the first partial transport protocol unit to decode the at least one a message according to a communication protocol selected from the group consisting of: Real Time Transport Protocol, Real Time Transport Control Protocol, and Hypertext Transfer Protocol.

13. The communication device as claimed in claim 10, wherein the data to be transmitted are real-time data.

14. A communication device comprising:
a source decoding means, coupled to a transport protocol means, for source-decoding source-coded data,
a transport protocol means for:
generating the source-coded data from at least one received transport protocol message, and
determining from the transport protocol message control information for controlling a playback processing of the source-decoded data; and
a processing means for processing the source-decoded data in accordance with the determined control information,
wherein: the at least one received transport protocol message is a real time transport protocol (RTP) message or a real time transport control protocol (RTCP) message and includes a header value that indicates the at least one received transport protocol message is a type that conveys control parameters for controlling playback processing; and the control information is to be included in a payload of the at least one received transport protocol message to control how the communication device is to identify or modify an output of one or more portions of audio content.

* * * * *